US009062220B2

(12) United States Patent
Kane et al.

(10) Patent No.: US 9,062,220 B2
(45) Date of Patent: Jun. 23, 2015

(54) LUMINESCENT BORATES, LUMINESCENT MATERIALS AND ARTICLES INCORPORATING SUCH BORATES

(71) Applicant: Honeywell International Inc., Morristown, NJ (US)

(72) Inventors: James Kane, Lawrenceville, NJ (US); Carsten Lau, Hannover (DE); William Ross Rapoport, Bridgewater, NJ (US)

(73) Assignee: Honeywell International Inc., Morristown, NJ (US)

( * ) Notice: Subject to any disclaimer, the term of this patent is extended or adjusted under 35 U.S.C. 154(b) by 180 days.

(21) Appl. No.: 13/803,052

(22) Filed: Mar. 14, 2013

(65) Prior Publication Data
US 2014/0151997 A1 Jun. 5, 2014

Related U.S. Application Data

(60) Provisional application No. 61/732,022, filed on Nov. 30, 2012.

(51) Int. Cl.
B42D 25/36 (2014.01)
C09D 5/22 (2006.01)
B42D 25/378 (2014.01)
C09K 11/77 (2006.01)
(Continued)

(52) U.S. Cl.
CPC .............. *C09D 5/22* (2013.01); *Y10T 428/2982* (2015.01); *B42D 25/36* (2014.10); *B42D 25/378* (2014.10); *C09K 11/7756* (2013.01); *C09K 11/7712* (2013.01); *Y10T 428/24802* (2015.01); *Y10T 428/24893* (2015.01); *C09K 11/778* (2013.01); *B42D 2033/14* (2013.01); *B42D 2033/20* (2013.01); *B42D 25/29* (2014.10); *B42D 25/00* (2014.10)

(58) Field of Classification Search
CPC ...................................... C09K 11/778
USPC .............. 428/195.1; 252/301.4 R; 283/83, 92
See application file for complete search history.

(56) References Cited

U.S. PATENT DOCUMENTS 4,387,112 A * 6/1983 Blach ................................ 427/7
4,946,621 A 8/1990 Fouassier et al.
5,569,317 A * 10/1996 Sarada et al. .................. 524/111
(Continued)

FOREIGN PATENT DOCUMENTS

KR 1020020074467 A 9/2002

OTHER PUBLICATIONS

International Search Report mailed Jul. 29, 2013 in International Application No. PCT/US2013/035601.
(Continued)

Primary Examiner — Gerard Higgins
(74) Attorney, Agent, or Firm — Ingrassia Fisher & Lorenz PC

(57) ABSTRACT

Luminescent borates, luminescent materials, and articles incorporating such borates are provided herein. An embodiment of a luminescent borate includes a host borate that has a $B_9O_{16}$-comprising crystal lattice. Neodymium and/or ytterbium are present within the host borate, and one or more substitutable elements are optionally present along with the neodymium and/or ytterbium within the host borate. The one or more substitutable elements are different from neodymium and ytterbium.

16 Claims, 3 Drawing Sheets

(51) Int. Cl.
  *B42D 25/29* (2014.01)
  *B42D 25/00* (2014.01)

(56) References Cited

U.S. PATENT DOCUMENTS

| | | | |
|---|---|---|---|
| 6,530,527 B1 * | 3/2003 | Ahlers et al. | 235/491 |
| 7,019,452 B2 * | 3/2006 | Srivastava et al. | 313/467 |
| 7,208,130 B2 | 4/2007 | Braconnier et al. | |
| 2007/0096057 A1 | 5/2007 | Hampden-Smith et al. | |
| 2008/0033300 A1 | 2/2008 | Hoang et al. | |
| 2010/0065780 A1 | 3/2010 | Buissette et al. | |

OTHER PUBLICATIONS

Tian, F.W., et al., Luminescence of Eu3+ and Eu2+ in the New BaLnB9O16 Borates (Ln = Rare Earth), Materials Research Bulletin., vol. 22, pp. 899-909, 1987.

Tian, F.W., et al., Luminescence Properties of Ce3+ and Tb3+ in a New Family of Boron-Rich Alkaline Earth Rare Earth Borates, Materials Research Bulletin, vol. 22, pp. 389-397, 1987.

Shen, C.F., et al., Investigation of a New Phosphor Host, BaLaB9O16 by AEM and XRD, Materials Research Bulletin, vol. 24, pp. 1223-1230, 1989.

* cited by examiner

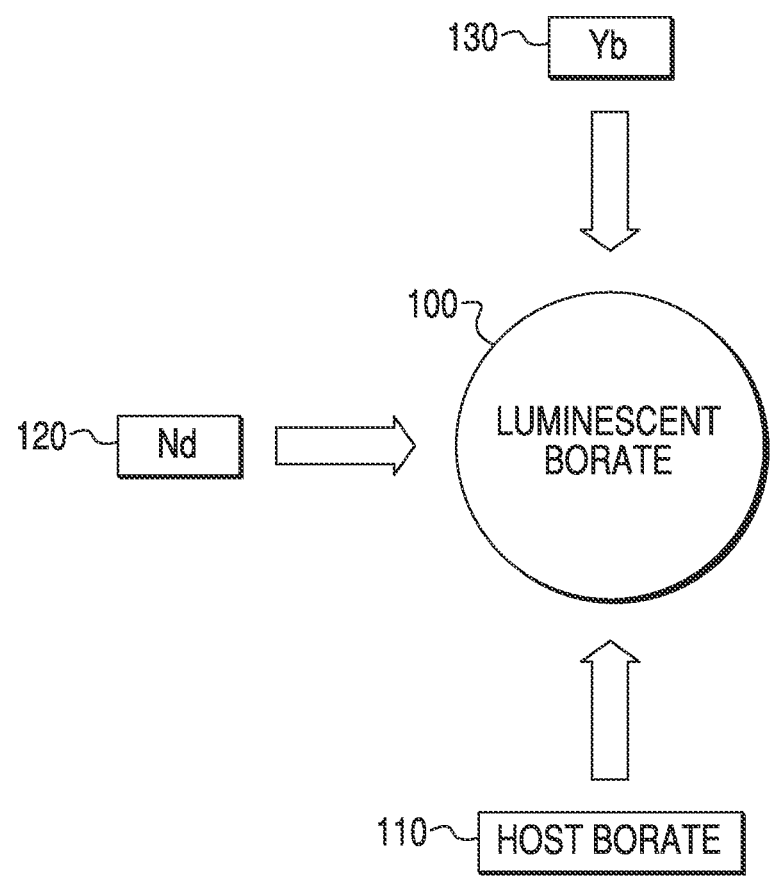

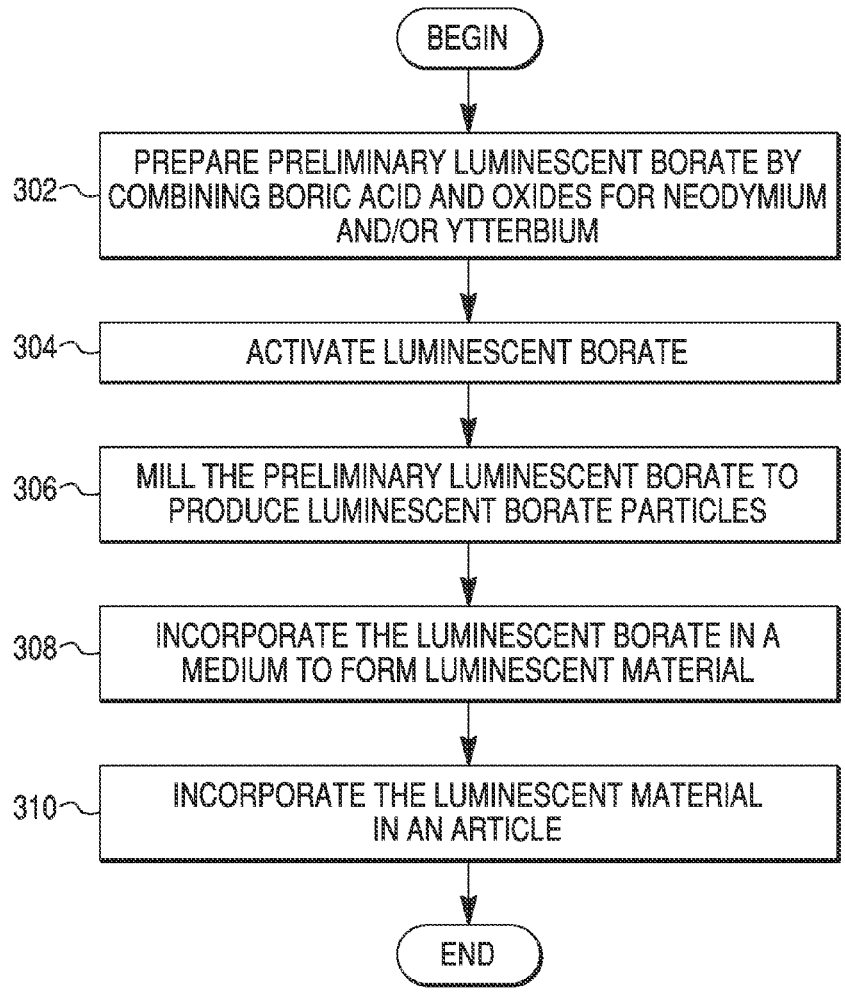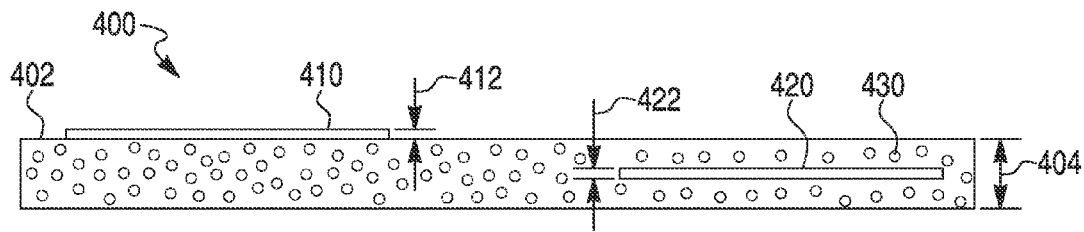

LUMINESCENT BORATES, LUMINESCENT MATERIALS AND ARTICLES INCORPORATING SUCH BORATES

PRIORITY CLAIMS

This application claims the benefit of U.S. Provisional Application No. 61/732,022, filed Nov. 30, 2012.

TECHNICAL FIELD

The technical field generally relates to radiation emitting compounds and more specifically relates to luminescent borates, luminescent materials and articles incorporating such borates.

BACKGROUND

A luminescent phosphor compound is a compound that is capable of emitting detectable quantities of radiation in the infrared, visible, and/or ultraviolet spectrums upon excitation of the compound by an external energy source. A typical luminescent phosphor compound includes at least a host material (e.g., a crystal lattice), an emitting ion (e.g., of a rare earth metal), and in some cases, a "sensitizing" ion (e.g., of a transition metal or of a different rare earth metal that can absorb and transfer the energy to the emitting rare earth metal ion). The production of radiation by a phosphor compound is accomplished by absorption of incident radiation by the emitting ion(s) or by either or both the host material and the sensitizing ion(s), followed by energy transfer from the host material/sensitizing ion(s) to the emitting ion(s), and radiation of the transferred energy by the emitting ion(s).

The selected components of a phosphor compound may cause the compound to have particular emission properties, including spectral emission that is at a wavelength greater than an excitation wavelength. Not every ion will produce emissions in all host materials, however. There are many examples in which radiation that has the potential for emission is quenched, or the energy transfer from the absorbing ions or the host material to the emitting ions is so poor that the radiation effects are barely observable. In other host materials, the radiation effects can be very large and with quantum efficiency near unity.

For a specific phosphor compound that does produce observable emissions, the spectral position(s) of the higher spectral energy content (or luminescent output) in its emissions (i.e., its "spectral signature") may be used to uniquely identify the phosphor compound from other compounds. Primarily, the spectral signature is due to the rare earth ion(s). However, spectral perturbations may be present due to the influence of the host material on the various emitting ions, typically through crystal field strength and splitting. This holds true for the temporal behavior of the emissions, as well.

The unique spectral properties of some phosphor compounds make them well suited for use in authenticating or identifying articles of particular value or importance (e.g., banknotes, passports, biological samples, and so on). Accordingly, luminescent phosphor compounds with known spectral signatures have been incorporated into various types of articles to enhance the ability to detect forgeries or counterfeit copies of such articles, or to identify and track the articles. For example, luminescent phosphor compounds have been incorporated into various types of articles in the form of additives, coatings, and printed or otherwise applied features that may be analyzed in the process of authenticating or tracking an article.

An article that includes a luminescent phosphor compound may be authenticated using specially designed authentication equipment through known authentication techniques. While such authentication techniques are highly effective at detecting and thwarting relatively unsophisticated forgery and counterfeiting activities, they do exhibit drawbacks. For example, individuals with the appropriate resources and equipment may be able to employ spectrometry techniques in order to determine the components of some phosphor compounds. The phosphor compounds may then be reproduced and used with unauthentic articles, thus compromising the authentication benefits that may otherwise be provided by a particular phosphor compound. Further, many phosphor compounds have relatively high densities, such as greater than or equal to about 5 grams per cubic centimeter. As a result, the phosphor compounds are difficult to disperse in many liquid mediums, including inks, and settling can result in uneven concentrations of the phosphor compounds upon application of the inks.

Accordingly, although a number of phosphor compounds have been developed to facilitate article authentication in the above-described manner, it is desirable to develop additional compounds, which may render forgery and counterfeiting activities more difficult, and/or which may prove beneficial for identifying and tracking articles of particular interest. Further, it is desirable to develop phosphor compounds that have a density of less than 5 grams per cubic centimeter and, therefore, can be effectively dispersed within liquid mediums such as ink. Furthermore, other desirable features and characteristics of the present invention will become apparent from the subsequent detailed description of the invention and the appended claims, taken in conjunction with the accompanying drawings and this background of the invention.

BRIEF SUMMARY

Luminescent borates, luminescent materials including particles of a luminescent borate, and articles including a security feature that includes particles of a luminescent borate are provided herein. In an embodiment, a luminescent borate includes a host borate that has a $B_9O_{16}$-comprising crystal lattice. Neodymium and ytterbium are present within the host borate, and one or more substitutable elements are optionally present along with the neodymium and ytterbium within the host borate. The one or more substitutable elements are different from neodymium and ytterbium.

In another embodiment, a luminescent material includes a medium and particles of a luminescent borate dispersed within the medium. The luminescent borate includes a host borate that has a $B_9O_{16}$-comprising crystal lattice. Neodymium and/or ytterbium are present within the host borate, and one or more substitutable elements are optionally present along with the neodymium and/or ytterbium within the host borate. The one or more substitutable elements are different from neodymium and ytterbium.

In another embodiment, an article includes a security feature. The security feature includes a medium and particles of a luminescent borate dispersed in the medium. The luminescent borate includes a host borate that has a $B_9O_{16}$-comprising crystal lattice. Neodymium and/or ytterbium are present within the host borate, and one or more substitutable elements are optionally present along with the neodymium and/or ytterbium within the host borate. The one or more substitutable elements are different from neodymium and ytterbium.

BRIEF DESCRIPTION OF THE DRAWINGS

Embodiments of the various embodiments will hereinafter be described in conjunction with the following figures, wherein like numerals denote like elements, and wherein:

FIG. 1 depicts potential components of a luminescent borate, according to various example embodiments;

FIG. 3 is a flowchart of a method for producing a luminescent borate, a medium that includes the borate, and an article that includes the borate-containing medium, in accordance with an example embodiment; and FIG. 4 is a cross-sectional, side view of an article that includes a substrate and an authentication feature, according to an example embodiment.

DETAILED DESCRIPTION

Figure 2A:
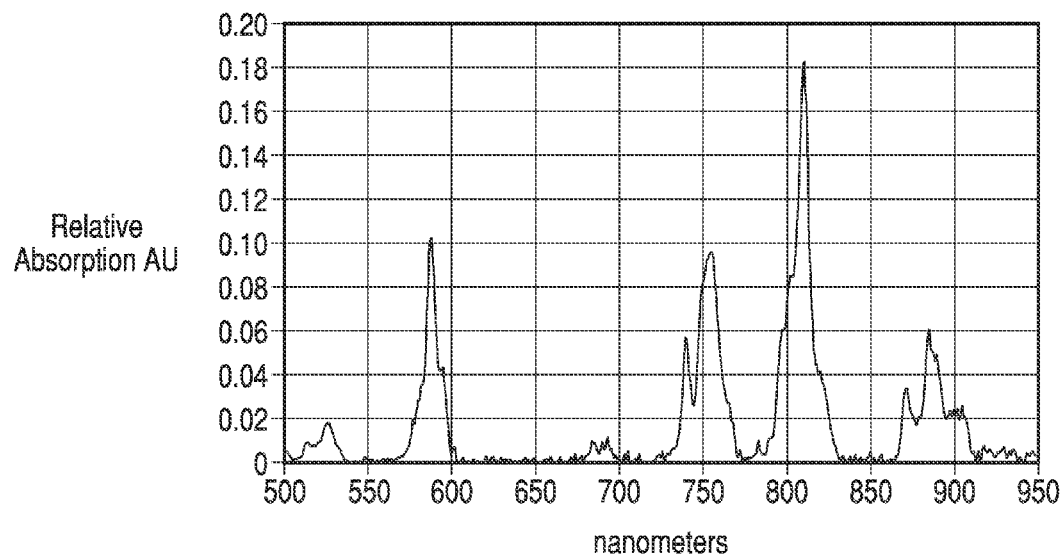
FIG. 2A is a graph depicting relative absorption across a wavelength spectrum for a luminescent borate having the formula Ba(NdYb) $B_9O_{16}$, with a ratio of neodymium to ytterbium of 80 to 20.

The following detailed description of various embodiments of the invention is merely exemplary in nature and is not intended to limit the inventive subject matter or the application and uses of the inventive subject matter. Furthermore, there is no intention to be bound by any theory presented in the preceding background or the following detailed description.

Embodiments discussed in detail below include luminescent borates, luminescent materials, methods for producing such luminescent materials, and articles that include luminescent borates. The embodiments of luminescent borates described below increase the diversity of available materials that may be used for authentication or identification. The spectral signature and decay time constants characterizing emissions from the luminescent borates discussed herein may be used as measurable quantities for the purpose of authentication. Further, the luminescent borates have a high boron content, as described in further detail below, that results in the luminescent borates having a density of less than 5 grams per cubic centimeter. As such, the luminescent borates tend to be effectively dispersed within liquid mediums such as ink to form stable dispersions; in this regard, they resist settling and provide for uniform concentrations of the luminescent borate upon application of the liquid mediums to a substrate. Also due to the boron content of the luminescent borates, the luminescent borates have a relatively high refractive index and low body color. The relatively high refractive index, such as a refractive index of from about 1.60 to about 1.65, enables refractive index matching with certain polymeric mediums that have a similar refractive index, thereby making it difficult to detect the presence of the luminescent borates in the polymeric mediums. Further, the low body color of the luminescent borates, even when neodymium is present in high amounts such as 100% substitution in the luminescent borates, makes it difficult to visually detect the presence of the luminescent borates in a particular medium with the human eye based upon color variation. Such features of the luminescent borates that are described herein all inhibit the ability of potential counterfeiters to detect and replicate security features that include the luminescent borates.

FIG. 1 depicts potential components of a luminescent borate 100, according to various exemplary embodiments. Luminescent borate 100 includes a host borate 110 that has a $B_9O_{16}$-comprising crystal lattice, which serves as a host crystal lattice material. In embodiments, the luminescent borate 100 also includes neodymium 120 (Nd) and/or ytterbium 130 (Yb) present within the host borate 110, which may be introduced into the host lattice by substituting for one or more substitutable elements that are different from neodymium and ytterbium, such as lanthanum (La) or another rare earth element including yttrium, as described in further detail below. The luminescent borate 100 optionally further includes the one or more substitutable elements present within the host borate 110.

The host borate 110 that has the $B_9O_{16}$-comprising crystal lattice more particularly includes a material into which the neodymium 120 and/or ytterbium 130 are incorporated, such as by substituting the one or more substitutable elements of the host borate 110 with the neodymium 120 and/or ytterbium 130. More particularly, the host borate 110 is a $B_9O_{16}$-comprising crystal lattice into which neodymium 120 and/or ytterbium 130 may substitute at various positions within the lattice. In an embodiment, host borate 110 is a borate having the formula $MeReB_9O_{16}$, where Me is selected from the group consisting of strontium, barium, or a mixture thereof, and Re represents the one or more substitutable elements. The $MeReB_9O_{16}$ is a monoclinic crystal. It is to be appreciated that the above formula represents an average formula for the host borate 110, with the host borate 110 potentially having different atoms for Me and Re at different locations within the crystal lattice of the host borate 110. Due to the size and configuration of the host borate 110 that has the formula $MeReB_9O_{16}$, in an embodiment, Me is barium throughout the crystal lattice. The term "substitutable element," as used herein, refers to an element of the host borate 110 that occupies certain sites within the crystal structure, where another element (e.g., neodymium 120 and/or ytterbium 130) may be substituted into those sites during formation of the luminescent borate 100. Examples of substitutable elements include rare earth elements, including yttrium, that are different from neodymium 120 and ytterbium. Examples of suitable rare element elements include, but are not limited to, lanthanum, cerium, europium, gadolinium, terbium, and mixtures thereof. Again, due to the size and configuration of the host borate 110 that has the formula $MeReB_9O_{16}$, in an embodiment, Re is lanthanum. A specific example of a suitable host borate 110 is barium lanthanum borate ($BaLaB_9O_{16}$). The description, below, primarily uses barium lanthanum borate as an example of a host borate 110 that is suitable for use with the various embodiments. It is to be understood that host borates other than barium lanthanum borate also could be used, such as the alternate examples listed above and any such borates having a +2 valence in the Me site and +3 valence in the Re site, and such alternate embodiments are considered to be within the scope of the inventive subject matter.

As set forth above, the one or more substitutable elements in the host borate 110 are substituted with neodymium 120 and/or ytterbium 130 in the resulting luminescent borate 100. For example, when the host borate 110 has the formula $MeReB_9O_{16}$, various embodiments of the luminescent borate 100 include either or both neodymium 120 and ytterbium 130 substituted into the Re sites. In particular, in an embodiment, the luminescent borate 100 has the formula $MeXB_9O_{16}$ wherein Me, B, and O are the same as set forth above, and X is neodymium 120 and/or ytterbium 130 and optionally Re, with neodymium, ytterbium, and Re present in X at any fraction up to 100%. As with the host borate 110 as described above, it is to be appreciated that the above formula for the luminescent borate 100 represents an average formula for the luminescent borate 100, with the luminescent borate 100 potentially having different atoms for Me and X at different locations within the luminescent borate 100.

The neodymium 120 and ytterbium 130 function in the luminescent borate 100 as emitting ions. As emitting ions, the neodymium 120 and ytterbium 130 produce detectable radiation upon receiving appropriate excitation energy. The neodymium 120 and ytterbium 130 may receive energy for subsequent radiation through multiple mechanisms. For example, neodymium 120 is capable of directly absorbing exciting radiation, and the neodymium 120 may thereafter radiate at least some of the absorbed energy (typically at a different and longer wavelength from the exciting radiation). As such, in an embodiment, the luminescent borate 100 includes 100 percent substitution of neodymium 120, as measured to detection limits in most commercially available diagnostic equipment such as energy dispersive X-ray spectroscopy equipment. Embodiments of the luminescent borate 100 that include the host borate 110 and neodymium 120 (but no ytterbium 130) are referred to herein as "Nd:Borate crystals."

The ytterbium 130 also may be directly excited, although ytterbium absorption bands are very close to the emission bands (e.g., the absorption bands start at about 910 nm). As such, in another embodiment, the luminescent borate 100 includes 100 percent substitution of ytterbium 130, as measured to detection limits in most commercially available diagnostic equipment such as energy dispersive X-ray spectroscopy equipment. Embodiments of the luminescent borate 100 that include the host borate 110 and ytterbium 130 (but no neodymium 120) are referred to herein as "Yb:Borates." In another embodiment, as alluded to above, the luminescent borate 100 includes substitution of both neodymium 120 and ytterbium 130. Embodiments of the luminescent borate 100 that include the host borate 110, neodymium 120, and ytterbium 130 are referred to herein as "Nd:Yb:Borate crystals."

As used herein, "appropriate excitation energy" refers to excitation energy having a range of wavelengths that corresponds to an absorption band of an absorbing ion of luminescent borate 100. When appropriate excitation energy is directed toward a luminescent borate 100 of any of the above-listed embodiments, the excitation energy is absorbed by absorbing ions within the luminescent borate 100, and emitting ions (i.e., neodymium 120 and/or ytterbium 130) within the luminescent borate 100 may produce detectable emissions. For example, in embodiments that include neodymium 120 (e.g., Nd:Borate crystals or Nd:Yb:Borate crystals), the neodymium 120 may function as an absorbing ion, which may directly absorb appropriate excitation energy (e.g., excitation energy in a neodymium 120 absorption band). In embodiments that also include ytterbium 130 (e.g., Nd:Yb:Borates), it has been found that the neodymium 120 efficiently transfers energy to the ytterbium 130, and the ytterbium 130 may produce detectable emissions in one or more ytterbium emission bands. Accordingly, the neodymium 120 functions as an absorbing ion, and the ytterbium 130 functions as an emitting ion. The neodymium 120 also may function as an emitting ion, which produces detectable emissions in one or more neodymium emission bands. As used herein, an "emission band" is defined herein to mean a continuous range of wavelengths of the electromagnetic spectrum within which concentrated, non-negligible (e.g., detectable) emissions occur from one or more emitting ions of the luminescent material. For any particular emitting ion, an "emission band" is bounded by a lower wavelength below which emissions are negligible for that ion, and an upper wavelength above which emissions are negligible for that ion.

An exemplary embodiment of the luminescent borate 100 includes the host borate 110 with the one or more substitutable elements (e.g., Re when host borate 110 has the formula MeReB$_9$O$_{16}$) substituted by neodymium 120 at a first substitution percentage of at least 20 percent, and/or the one or more substitutable elements are substituted by ytterbium 130 at a second substitution percentage. The amount of neodymium 120 and/or ytterbium 130 that is substituted into host borate 110 is described herein in terms of atomic percent. The second substitution percentage may be equal to or different from the first substitution percentage. For example, in an embodiment, the one or more substitutable elements are substituted by neodymium 120 at a substitution percentage in a range of about 50 to about 95 percent, and the one or more substitutable elements are substituted by ytterbium 130 at a substitution percentage in a range of about 50 to about 5 percent. In another exemplary embodiment, the first substitution percentage is in a range of about 85 to about 95 percent, and the second substitution percentage is in a range of about 15 to about 5 percent.

The host borate 110 may be referred to as a stoichiometric borate, meaning that one or more emitting ions (e.g., neodymium 120 and/or ytterbium 130) may be 100 percent substituted into the crystal lattice for the one or more substitutable elements (e.g., Re in the formula MeReB$_9$O$_{16}$, with Re being the rare earth element such as lanthanum), with the resulting luminescent borate 100 still possessing useful luminescent properties. According to an embodiment, the number of atoms of the one or more substitutable elements in the host borate 110 that may be replaced by neodymium 120 and/or ytterbium 130 is equal to 100 percent. In other words, the total, combined substitution percentage of the neodymium 120 and ytterbium 130 for the one or more substitutable elements, Re, may be up to 100 percent, although it can be less than 100 percent, as well. By "100 percent substituted," it is meant that complete substitution of neodymium 120 and/or ytterbium for the one or more substitutable elements is achieved as measured to detection limits of most commercially available diagnostic equipment such as energy dispersive X-ray spectroscopy equipment, with trace amounts of the one or more substitutable elements possibly present below detection limits of the equipment. In other embodiments, at least some of the one or more substitutable elements may still be present in the luminescent borate 100 along with the neodymium 120 and/or ytterbium 130, and the one or more substitutable elements may be present in amounts that can be detected with most commercially available diagnostic equipment such as energy dispersive X-ray spectroscopy equipment. Each atom of the one or more substitutable elements in the host borate 110 that allows for replacement with neodymium 120 or ytterbium 130 atoms has a similar size, similar loading, and similar coordination preference as the ion it will be replaced with. During formation of the luminescent borate 100, the atoms in each position within the host borate 110 will be accounted for 100 atomic percent. Although many emitting ions are concentration quenched well below a 100 percent substitution level, it has been found that, in certain embodiments, neodymium 120 may be substituted into the host borate 110 at substitution percentages up to 100 percent without extensive concentration quenching. It is believed that the high neodymium 120 substitution levels are possible because the physical separation of the neodymium 120 and/or ytterbium 130 in the host borate 110 is sufficiently far apart so that the interaction term is significantly reduced.

Figure 2B:
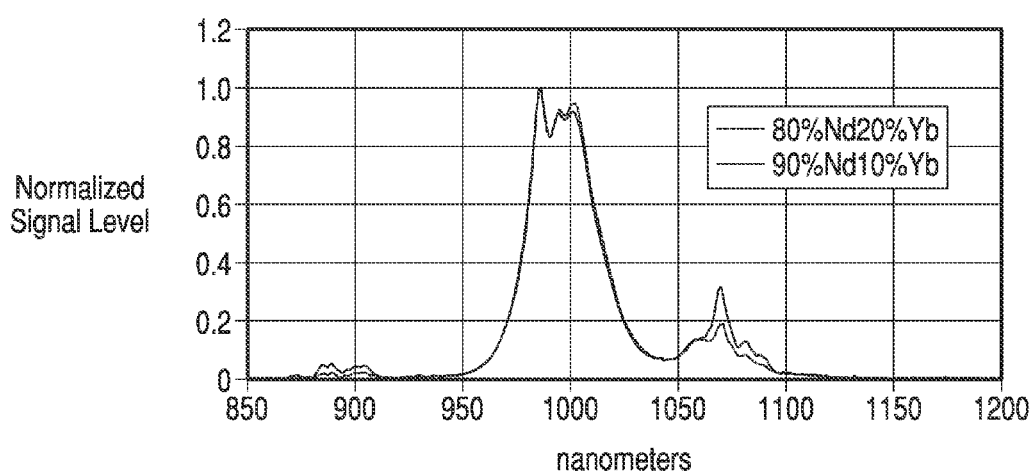
FIG. 2B is a graph depicting emission spectra for luminescent borates having the formula Ba(NdYb) $B_9O_{16}$ with different ratios of neodymium to ytterbium.

In various embodiments of luminescent borate 100, as shown in FIG. 2B, ytterbium 130 produces relatively strong emissions centered at about 985 nanometers (nm) and about 1050 nm, with emissions in the 985 nm band typically being of higher intensity. In addition, in some embodiments, neodymium 120 produces relatively strong emissions centered at about 880 nm and 1065 nm, with emissions in the 1065 nm band typically being of higher intensity. In the emission spectra shown in FIG. 2B, the band from 875-910 is attributable to neodymium emission, the band from 960-1040 nm is attributable to ytterbium emission, the relatively small peak at 1060 nm is attributable to Yb and the relatively larger peak at 1065 nm is attributable to neodymium. In the emission spectra of FIG. 2B, a reduction in a relative amount of neodymium and a commensurate increase in a relative amount of ytterbium results in less neodymium emission since energy transfer between neodymium and ytterbium is more complete.

FIG. 2A is a graph 200 depicting relative absorption (in arbitrary units, AU) of neodymium as a function of excitation wavelength (in nm), according to an exemplary embodiment. More specifically, as shown in FIG. 2A, relative absorption is shown in an embodiment that includes barium lanthanum borate with the lanthanum substituted by neodymium at 80 percent, and the lanthanum substituted by ytterbium at 20 percent (with lanthanum thus completely substituted).

The embodiments of the luminescent borate 100, as described above, have material properties that make them particularly well-suited for various unique applications. In particular, due to the high boron content in the host borate 110 of 9 boron atoms, the luminescent borate 100 has a density of less than or equal to 4 grams per cubic centimeter (g/cc) such as from 2.3 to 4 g/cc. In an embodiment where the luminescent borate 100 has the formula $MeXB_9O_{16}$, the luminescent borate 100 has a density of about 2.45 g/cc, which makes the luminescent borate 100 more readily dispersible in liquid mediums such as ink. In addition, it has been observed that embodiments of luminescent borate 100 have a very weak body color (note in FIG. 2A that there is only one major peak in the visible wavelength spectrum and it is very narrow; most of the absorption is in the infrared wavelength spectrum (>700 nm)), making luminescent borate 100 particularly suitable for use in covert authentication applications. For example, embodiments of luminescent borate 100 may be incorporated into a clear ink or other medium, and printed onto an article 400 in a manner that the borate-containing ink or medium is not readily detectable to the unaided eye. In a specific embodiment, the ink or ink additive includes colored dye and may contain black dye, which becomes infrared transparent at wavelengths above 660 nm. In particular, due to the weak body color and the absorption/emission wavelengths of the luminescent borate being higher than 660 nm, the luminescent borate 100 can be included in the ink or ink additive that includes the black dye without the black dye interfering with detection of the luminescent borate. Further, the presence of the luminescent borate 100 in the ink or ink additive is visibly obscured by the black dye.

FIG. 3 is a flowchart of a method for producing a luminescent borate (e.g., luminescent borate 100, FIG. 1), a medium that includes the luminescent borate to form a luminescent material, and an article (e.g., article 400, FIG. 4) that includes the luminescent material, in accordance with an exemplary embodiment. The method begins, in block 302, by preparing a preliminary luminescent borate (e.g., luminescent borate 100, FIG. 1) having the formula $MeXB_9O_{16}$. Generally, the luminescent borate may be created using any of a number of conventional processes that are known to those of skill in the art. For example, formation of preliminary luminescent borates of the various embodiments may be achieved using solid state chemistry, as described below. More specifically, according to an embodiment, the preliminary luminescent borate is prepared by growing a borate crystal using components that include all of the elements of the borate, typically in the form of oxides.

For example, a luminescent borate having the formula $MeXB_9O_{16}$ may be prepared using solid state chemistry. More particularly, to incorporate boron in the preliminary luminescent borate, boric acid ($H_3BO_3$) is one of the components used to grow the preliminary luminescent borate. As discussed previously, the element Me in the host borate may be strontium and/or barium in various embodiments. Accordingly, another of the components used to grow the preliminary luminescent borate is strontium carbonate (SrCO3) and/or barium carbonate ($BaCO_3$) (referred to below as "Me carbonates"), respectively, depending on which element Me is used in the luminescent borate. In addition, the element X in the luminescent borate may be neodymium, ytterbium, or one or more substitutable elements different from neodymium and ytterbium, such as lanthanum. Accordingly, another of the components used to grow the preliminary luminescent borate is neodymium oxide ($Nd_2O_3$), ytterbium oxide ($Yb_2O_3$), or an oxide of the one or more substitutable elements such as lanthanum oxide ($La_2O_3$) (referred to below as "Re oxides"), respectively, depending on which element X is used in the luminescent borate.

According to an embodiment, the neodymium and ytterbium in the neodymium oxide and ytterbium oxide have +3 valences. In order to substitute neodymium and/or ytterbium into the preliminary luminescent borate, some or all of the Re oxides that include the one or more substitutable elements are replaced with desired amounts of neodymium oxide, or a combination of neodymium oxide and ytterbium oxide, where replacement quantities are defined in terms of atomic number (i.e., indicating the percentage of atoms of the one or more substitutable elements that are replaced with neodymium and/or ytterbium atoms). For example, if it were desired to have 60 percent substitution of neodymium and 10 percent substitution of ytterbium in the X sites of the preliminary luminescent borate, 60 percent of the Re oxides that include the one or more substitutable elements would be replaced with neodymium oxide, and 10 percent of the Re oxides that include the one or more substitutable elements would be replaced with ytterbium oxide.

Once combined in the appropriate quantities (e.g., in quartz boats and/or alumina crucibles), the luminescent borate is activated, in block 304, by firing the combined components (e.g., generally only once) at prescribed temperatures (e.g., temperatures in a range of about 500-1200 C, or a different range) for prescribed times (e.g., times in a range of about 30-60 minutes, or a different range) with the ramps to the higher temperatures within the aforementioned range conducted over longer times within the aforementioned range. Optionally, the combined components are first fired at lower temperatures within the aforementioned range, next powderized, and then re-fired at a higher temperature within the aforementioned range. The resulting, powderized crystal thus forms the preliminary luminescent borate.

Although solid state chemistry may be used to create the preliminary luminescent borate, as discussed above, in other cases, solution chemistry techniques may be used. Using solution chemistry, the various materials are dissolved, subsequently precipitated, and subsequently fired. Depending on the particular process used to create the luminescent borate, other materials may be included in forming the preliminary luminescent borate. For example, various fluxing agents and other pre-cursors may be included within the preliminary luminescent borate.

In block 306, the preliminary luminescent borate may be further milled and/or filtered to produce crystal particles of desired sizes. For example, it has been found that the efficiency of the various embodiments of luminescent borates described herein may remain relatively high even when the luminescent borate powder includes particles with average particle sizes of less than about 200 microns, such as from about 0.2 to about 6 microns or, alternatively, from about 0.2 to about 0.8 microns. Particles of the luminescent borate within the above ranges can also be readily dispersed in liquid mediums to form stable dispersions at ambient temperatures of about 21° C. As used herein, the term "average particle size" is defined as a particle mean diameter (e.g., a mass volume 50 percent point (D50) particle size mean diameter, as measured by a laser light diffraction type of measurement device, such as a device produced by Microtrac Inc. of Montgomeryville, Pa.).

In block 308, the luminescent borate particles are incorporated into a medium to form a luminescent material. For example, but not by way of limitation, the medium may correspond to a substrate of an article, or the medium may correspond to a material that may be applied to (e.g., printed on, coated on, sprayed on, or otherwise adhered to or bonded to) the surface of an article substrate, or a feature that is embedded within a substrate (e.g., an embedded feature, a security thread, and so on). In the former case, the luminescent borate particles may be incorporated into a substrate material, for example, by combining the luminescent borate particles with a base material (e.g., paper, paper pulp, a polymer, plastic, plastic base resin, glass, metal, a textile, fiber, ceramic, wood, a slurry, mixtures thereof, and so on) for the substrate, and/or by impregnating the substrate with a colloidal dispersion of the luminescent borate particles. Impregnation may be performed, for example, by a printing, dripping, coating or spraying process.

In embodiments in which the luminescent borate particles are incorporated into a medium that may be applied to a surface of a substrate, the luminescent borate particles are mixed in with the medium (e.g., an ink, ink additive or other carrier) to disperse the luminescent borate particles in the medium and to form the luminescent material, followed by applying the luminescent material to the surface of the substrate. In embodiments in which the luminescent borate particles are incorporated into a feature that is embedded within a substrate, incorporation of the luminescent borate particles into the feature may be performed in a similar manner to incorporation of the luminescent borate into the substrate, as discussed above. More particularly, the luminescent borate particles may be mixed with a base material from which the embedded feature is formed. In still other embodiments, luminescent borate particles may be incorporated or combined with other media (e.g., glues, various liquids, gels, and so on).

In block 310, an article is produced that includes the luminescent borate. For example, this may be accomplished by incorporating the luminescent material that includes the luminescent borate particles in the medium in or on an article (e.g., article 400, FIG. 4). In embodiments in which the luminescent material is the base material for the substrate (e.g., substrate 402, FIG. 4), this step may be bypassed. Conversely, in embodiments in which the luminescent material is applicable to a surface of the substrate, the luminescent material may be printed onto one or more surfaces of the substrate in predetermined locations. Conversely, when the luminescent material corresponds to an embedded feature, the embedded feature is integrated with the substrate material when the substrate material is in a malleable form (e.g., when the material is a slurry, molten, or non-cured form). In any one of the above-described manners, an embodiment of a luminescent borate may be incorporated into an article.

FIG. 4 depicts a cross-sectional view of an article 400 that includes a luminescent borate, according to an example embodiment. For example, an embodiment of an article 400 may include surface-applied and/or embedded security features 410, 420, respectively, that include the luminescent borate particles (not illustrated) dispersed in a medium, and/or the article 400 may include luminescent borate particles 430 that are evenly or unevenly dispersed within one or more components of the article 400 (e.g., within substrate 402 and/or one or more layers or other components of the article 400). The various relative dimensions of the security features 410, 420 and particles 430 may not be to scale in FIG. 4. Although article 400 is illustrated to include both surface-applied and/or embedded security features 410, 420 and particles 430, another article may include one or a combination of embedded security features, surface-applied security features, and dispersed luminescent borate particles. Finally, although only one surface-applied security feature 410 and one embedded security feature 420 are shown in FIG. 4, an article 400 may include more than one of either type of security feature 410, 420.

In various embodiments, article 400 may be any type of article selected from a group that includes, but is not limited to, an identification card, a driver's license, a passport, identity papers, a banknote, a check, a document, a paper, a stock certificate, a packaging component, a credit card, a bank card, a label, a seal, a token (e.g., for use in gambling and/or with a gaming or vending machine), a postage stamp, a liquid, a human, an animal, and a biological sample. Substrate 402 may be any of various types of substrates, and includes one or more materials selected from a group that includes, but is not limited to, paper, a polymer, glass, a metal, a textile, and a fiber.

Substrate 402, which may be rigid or flexible, may be formed from one or more layers or components, in various embodiments. The variety of configurations of substrate 402 are too numerous to mention, as the luminescent borates of the various embodiments may be used in conjunction with a vast array of different types of articles. Therefore, although a simple, unitary substrate 402 is illustrated in FIG. 4, it is to be understood that substrate 402 may have any of a variety of different configurations. For example, a substrate 402 may be a "composite" substrate that includes a plurality of layers or sections of the same or different materials. For example, but not by way of limitation, a substrate may include one or more paper layers or sections and one or more plastic layers or sections that are laminated or otherwise coupled together to form the composite substrate (e.g., a paper layer/plastic layer/paper layer or plastic layer/paper layer/plastic layer composite substrate). In addition, although inanimate, solid articles are discussed herein, it is to be understood that an "article" also may include a human, an animal, a biological specimen, a liquid sample, and virtually any other object or material into or onto which a luminescent material of an embodiment may be included.

Surface-applied security feature 410 may be, for example but not by way of limitation, a printed security feature or a security feature that includes one or more rigid or flexible materials into which or onto which a luminescent borate of an embodiment is included. For example, but not by way of limitation, the surface-applied security feature 410 may comprise an ink, pigment, coating, or paint that includes particles of a luminescent borate of an embodiment dispersed therein. Alternatively, the surface-applied security feature 410 may comprise one or more rigid or flexible materials into which or onto which particles of a luminescent borate of an embodiment are included, where the rigid or flexible material is then adhered or otherwise attached to a surface of the article substrate 402. According to various embodiments, surface-applied security feature 410 may have a thickness 412 of about one micron or more, and surface-applied security feature 410 may have a width and length that is less than or equal to the width and length of the substrate 402.

Embedded security feature 420 comprises one or more rigid or flexible materials in which or onto which a luminescent borate of an embodiment is included. For example, but not by way of limitation, embedded security feature 420 may be configured in the form of a discrete, rigid or flexible substrate, a security thread, or another type of structure. According to various embodiments, embedded security feature 420 may have a thickness 422 in a range of about one micron up to the thickness 404 of the substrate 402, and embedded security feature 420 may have a width and length that is less than or equal to the width and length of the substrate 402.

As mentioned above, luminescent borate particles 430 may be evenly or unevenly dispersed within substrate 402, as shown in FIG. 4, or within one or more other components of the article 400 (e.g., within one or more layers or other components of the article), in other embodiments. The luminescent borate particles 430 may be dispersed within substrate 402 or another component, for example but not by way of limitation, by mixing particles 430 into a base material for the substrate 402 or other component, and/or by impregnating the substrate 402 or other component with a colloidal dispersion of the particles 430, as discussed previously.

The absorption and emission properties of embodiments of luminescent borates discussed herein (e.g., luminescent borate 100, FIG. 1) are consistent with their use in conjunction with security and authentication features. For example, using relatively conventional authentication equipment, embodiments of luminescent borates may be readily excited. In embodiments that include neodymium (e.g., Nd:Yb:Borate crystals), the luminescent borates may be excited with excitation energies in the neodymium absorption band. As discussed previously, in embodiments that include both neodymium and ytterbium (e.g., Nd:Yb:Borate crystals), the neodymium may readily transfer absorbed energy to ytterbium (e.g., energy absorbed directly as excitation energy in the neodymium absorption band). In such embodiments, the neodymium may produce detectable emissions in neodymium emission bands, and the ytterbium may produce detectable emissions in ytterbium emission bands.

According to an embodiment, detection equipment may be configured to detect either or both the neodymium and the ytterbium emissions, and to determine whether those emission intensities fall within a detection parameter space. In addition, it has been found that the ratio of the peaks between the neodymium and ytterbium emissions is a strong function of the neodymium and ytterbium substitution percentages. Accordingly, embodiments of authentication equipment may measure the intensities of emissions in a neodymium emission band (e.g., an emission band centered at about 880 nm) and an ytterbium emission band (e.g., an emission band centered at about 985 nm), calculate the ratio of those intensities, and determine whether the ratio corresponds to an authenticating material with the appropriate luminescent borate, and the known neodymium and ytterbium substitution percentages. Systems and authentication equipment for authenticating articles that include security features with the luminescent borates can be readily identified and used by those of skill in the art. While systems and authentication equipment that are useful for authenticating articles that include security features with the luminescent borates are not limited, in an embodiment in which the Nd:Yb:Borate crystals are used, silicon detectors may be employed to effectively detect wavelengths of the ytterbium emission band. However, it is to be appreciated that other types of detectors that are capable of detecting emissions within a band of interest may be used, in other embodiments (e.g., lead-sulfide, lead-selenide, germanium, indium-antimonide, indium-arsenide, indium-gallium-arsenide, platinum-silicide, indium-antimonide, and so on).

When the analysis indicates that the values corresponding with authenticating parameters fall within a detection parameter space to within an acceptable degree of accuracy, the article 400 may be identified as being authentic. Conversely, when the analysis indicates that the values corresponding with the authenticating parameters do not fall within the detection parameter space to within an acceptable degree of accuracy, the article 400 may be identified as being unauthentic.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A luminescent borate comprising:
a host borate having a $B_9O_{16}$-comprising crystal lattice;
neodymium and ytterbium present within the host borate; and
optionally, one or more substitutable elements present within the host borate, the one or more substitutable elements being different from neodymium and ytterbium;
wherein the luminescent borate has a formula $MeXB_9O_{16}$
wherein
Me is selected from the group consisting of strontium, barium, and a mixture thereof; and
X is a mixture of neodymium and ytterbium, optionally including the one or more substitutable elements, wherein the one or more substitutable elements are selected from the group consisting of lanthanum, cerium, gadolinium, terbium, and mixtures thereof.

2. The luminescent borate of claim 1, having a density of less than or equal to 4 grams per cubic centimeter.

3. The luminescent borate of claim 1, wherein Me is barium.

4. The luminescent borate of claim 3, wherein the one or more substitutable elements are present in the luminescent borate and consist of lanthanum.

5. The luminescent borate of claim 1, wherein the one or more substitutable elements are absent therefrom.

6. The luminescent borate of claim 1, wherein the luminescent borate is in a form of particles with an average particle size of less than 200 microns.

7. A luminescent material comprising:
a medium; and
particles of a luminescent borate dispersed in the medium, the luminescent borate comprising:
a host borate having a $B_9O_{16}$-comprising crystal lattice;
neodymium and/or ytterbium present within the host borate; and
optionally, one or more substitutable elements present within the host borate, the one or more substitutable elements being different from neodymium and ytterbium; wherein the luminescent borate has a formula $MeXB_9O_{16}$, wherein Me is selected from the group consisting of strontium, barium, and a mixture thereof; and X is neodymium, ytterbium, or a mixture thereof, optionally including the one or more substitutable elements, wherein the one or more substitutable elements are selected from the group consisting of lanthanum, cerium, gadolinium, terbium, and mixtures thereof.

8. The luminescent material of claim 7, wherein the particles have an average particle size of less than 200 microns.

9. The luminescent material of claim 8, wherein the medium is chosen from the group of an ink, an ink additive, a glue, a liquid, a gel, a polymer, a slurry, a plastic, plastic base resin, a glass, a ceramic, a metal, a textile, wood, fiber, paper pulp, paper, and mixtures thereof.

10. The luminescent material of claim 9, wherein the medium is ink or ink additive.

11. The luminescent material of claim 7, wherein the luminescent borate has neodymium and ytterbium present within the host borate.

12. The luminescent material of claim 7, wherein the luminescent borate has a formula $BaXB_9O_{16}$, where Ba is barium; and X is neodymium, ytterbium, or a mixture thereof, optionally including the one or more substitutable elements, wherein the one or more substitutable elements are selected from the group consisting of lanthanum, cerium, gadolinium, terbium, and mixtures thereof.

13. An article comprising:
a security feature that includes
 a medium; and
  particles of a luminescent borate dispersed in the medium, the luminescent borate comprising:
   a host borate having a $B_9O_{16}$-comprising crystal lattice;
   neodymium and/or ytterbium present within the host borate; and
   optionally, one or more substitutable elements present within the host borate, the one or more substitutable elements being different from neodymium and ytterbium; wherein the luminescent borate has a formula $MeXB_9O_{16}$, wherein Me is selected from the group consisting of strontium, barium, and a mixture thereof; and X is neodymium, ytterbium, or a mixture thereof, optionally including the one or more substitutable elements, wherein the one or more substitutable elements are selected from the group consisting of lanthanum, cerium, gadolinium, terbium, and mixtures thereof.

14. The article of claim 13, further comprising a substrate, wherein the medium is an ink that is printed on a surface of the substrate.

15. The article of claim 13, wherein the article is selected from a group consisting of an identification card, a driver's license, a passport, identity papers, a banknote, a check, a document, a paper, a stock certificate, a packaging component, a credit card, a bank card, a label, a seal, a postage stamp, a token, a liquid, a human, an animal, and a biological sample.

16. The article of claim 13, wherein the luminescent borate has a formula $BaXB_9O_{16}$, where Ba is barium; and X is neodymium, ytterbium, or a mixture thereof, optionally including the one or more substitutable elements, wherein the one or more substitutable elements are selected from the group consisting of lanthanum, cerium, gadolinium, terbium, and mixtures thereof.

* * * * *